United States Patent [19]

Lever et al.

[11] 3,909,486

[45] Sept. 30, 1975

[54] METHOD OF HALOGENATING THERMOPLASTIC POLYOLEFINS

[75] Inventors: Ray Clarence Lever, Fairfield; Edward Vincent Wilkus, Trumbull, both of Conn.

[73] Assignee: General Electric Company, New York, N.Y.

[22] Filed: June 28, 1973

[21] Appl. No.: 374,521

[52] U.S. Cl............ 260/42; 260/17.4 R; 260/42.46; 260/42.47; 260/42.52; 260/83.3; 260/86.7; 260/88.2 S; 260/93.7; 260/94.9 H; 260/94.9 HA
[51] Int. Cl. .......................................... C08f 45/04
[58] Field of Search..... 260/94.9 H, 96 HA, 17.4 R, 260/42, 42.46

[56] References Cited
UNITED STATES PATENTS

| | | | |
|---|---|---|---|
| 3,113,118 | 12/1963 | Canterino et al. | 260/41 |
| 3,282,910 | 11/1966 | Klug et al. | 260/94.9 H |
| 3,467,640 | 9/1969 | Kaupp et al. | 260/94.9 H |
| 3,547,866 | 12/1970 | Trieschmann et al. | 260/94.9 H |
| 3,706,724 | 12/1972 | Blanchard et al. | 260/94.9 H |

*Primary Examiner*—James H. Derrington
*Attorney, Agent, or Firm*—R. G. Simkins; P. L. Schlamp; F. L. Neuhauser

[57] ABSTRACT

A method of halogenating thermoplastic polyolefin materials, comprising mixing a thermoplastic polyolefin in particulate form with particulate filler type material in an atmosphere comprising vaporous halogen and in progressive sequence, melting the surface portions of the particles of thermoplastic polyolefin, reacting the halogen with the molten surface portions of the polyolefin particles while combining filler with said molten surface portions, and removing the resulting halogen reacted melt which has been combined with filler from the underlying thermoplastic polyolefin material of the particles. The mixing and melting, halogenating, and the combining and removing of the combined components, are each continued until the desired extent of halogenation of the polyolefin is achieved, and can be carried to the substantial complete diminution of the particles of polyolefin material whereby the polyolefin material is substantially uniformly halogenated throughout its mass.

18 Claims, No Drawings

METHOD OF HALOGENATING THERMOPLASTIC POLYOLEFINS

BACKGROUND OF THE INVENTION

Polyolefins, such as polyethylene, have been halogenated by means of a variety of techniques or systems in the prior art, including for example, applying the halogen agent to the polymer materials while the latter is dispersed in solution, suspension, fluidized bed, etc. These systems, as well as other prior art techniques, are described in a number of patents, including U.S. Pat. Nos. 2,398,803; 2,405,971; 2,422,919; 2,481,188; 2,592,763; 2,849,431; 2,890,213; 2,920,064; 2,928,819; 2,959,562; 2,973,088; 3,033,845; 3,060,164; 3,113,118; 3,227,781; 3,282,910; 3,454,544; 3,467,640; and 3,563,974. Also United Kingdom Pat. Nos. 799,952; 815,234; and 834,905.

However, as noted in the section relating to the chlorination of polyethylene in the *Encyclopedia of Polymer Science and Technology*, entitled "Ethylene Polymers", pages 431 to 454 of Vol. 6, these prior art systems are each handicapped by one or more shortcomings which are more or less peculiar to the particular means of a given system. For example, while the chlorination of polyolefins dissolved in solution is easily controllable and relatively uniform, there is the added costs of solvents and their handling, and it is difficult to completely remove the halogenated solvent and residual hydrogen chloride from the product. Also the solubility of the polyolefin material changes commensurate with its degree of halogenation which often attributes problems as the reaction progresses, and solvents and/or suspending mediums frequently have a retarding influence upon the halogenation reaction. On the other hand, with systems based upon treating polymers in particulate solid form, including suspension, fluidized bed, bulk, and like techniques, uniformity of halogenation throughout the mass of the particles of polymer material is all but impossible to achieve because the reaction takes place predominantly on the surface of the particles of polymeric material since access of the halogen to the internal polymer molecules is inhibited. Moreover, non-uniformity of halogenation can be incurred regardless of the fineness of the size of the solid particles of polymer treated with a halogen, or the system or means of applying the halogen to solid polymers. For instance many polymeric materials such as polyethylene typically contain both crystalline and amorphour phases dispersed throughout their masses, and because the amorphous form of the polymer is highly susceptable to reaction with halogens whereas the crystalline form is not, this variation in the make up of the polymer results in non-uniform concentrations of the halogenation throughout the treated polymer material.

SUMMARY OF THE INVENTION

This invention comprises a novel process for the halogenation of thermoplastic polyolefin materials which obviates any need for solvents or suspending mediums, thereby avoiding the difficulties often imposed by the presence of such processing aids. The invention also overcomes the impediments heretofore usually encountered when treating solid particles of polyolefin material.

The novel process of this invention provides for the continuous and progressive exposure of a succession of new surfaces of hot molten polyolefin material on the polymer particles accessible for reaction with the halogen.

The invention includes the halogenation of particles of thermoplastic polyolefins utilizing a particulate material, such as typical fillers for plastics and elastomers, to cause or supplement heating of the thermoplastic polyolefin particles to the extent of effecting a melting of their surface portions, and the progressive removal of portions of the surface molten material from the underlying substratum of the particle. The melting of the surface portions of the polymer particles and the removal of molten material with the particulate filler material is progressively maintained and can be continued substantially through the mass of the particles if desired, thereby providing for the exposure of substantially all of the mass of the polymer material of the particles in a succession of small film-like increments of extensive surface area to the action of the halogen. This progressive exposure of new molten polymeric material to the action of the halogen provides optimum conditions for the achievement of a substantially homogeneous halogenation of the entire mass of the polymeric material regardless of the initial size of the particles, and, in turn, more uniform and improved physical and chemical properties in the halopolyolefin products.

Briefly the method of halogenating thermoplastic polyolefin materials of this invention comprises mixing particles of the polyolefin material with particulate filler-type material and melting the surface portions of thermoplastic particles of polyolefin in the presence of a halogen in a reactive form such as vapor. The exposed hot molten surface of polyolefin is especially receptive to rapid reaction with the halogen. With continued mixing, the filler material combines with the melting polymer by physically adhering to or penetrating the softening and viscid melting surface of the particles and the resulting superficial combination of the surface melt and filler is removed from the underlying thermoplastic polyolefin material of the particle by the attrition of the mixing action. This process of mixing and heating, and providing a gaseous halogen, is continued, and the resultant successive surface melting and exposure to reactive halogen, the combining of the melt and filler, and the removal of the halogen reacted and combined ingredients, progressively diminishes the particles of thermoplastic polyolefin with a commensurate incremental exposure of its mass to the action of the halogen, until the desired amount and/or degree of homogeneity of the halogenation is achieved.

When a filled compound is desired or appropriate, the processing filler can be retained in the halogenated polymer product, or the filler can thereafter be removed.

OBJECTS OF THE INVENTION

It is a primary object of this invention to provide an improved method of reacting a halogen with polyolefin materials.

It is also an object of this invention to provide a method of producing a homogeneous halogenation of polyolefin materials.

It is a further object of this invention to provide an economical method of halogenating polyolefin materials which does not require costly and frequently troublesome reaction mediums, or complicated processing operations.

It is an additional object of this invention to provide a method of simultaneously halogenating polyolefin material while preparing filled compounds thereof comprising blends of halogenated polymers with fillers, and/or additives such as preservatives, stabilizers, curing agents, etc.

DESCRIPTION OF A PREFERRED EMBODIMENT

The improved method of halogenating thermoplastic polyolefins of this invention comprises mixing particles of the polyolefin material with particulate filler-type material in the presence of a halogen and thereby effecting a progressive exposure of the polymeric material in small increments of large surface area to the action of the halogen. This method can be carried out in substantially any type of mixing device providing a sufficient degree of agitation to achieve and maintain an extensive intermingling action between the particles of the thermoplastic polyolefin material and filler in the presence of a halogen. However to expedite the process, it is preferred that the mixing of the components within an atmosphere containing halogen be performed in an impeller type mixer, such as exemplified by a glas-slined Pfaudler stirred kettle mixer or a Henschel type mixing apparatus as shown in U.S. Pat. No. 2,945,634 which is adapted for producing a very vigorous intermingling of particles. These types of apparatus generally operates with agitator speeds within a range of about 10 to 2000 R.P.M. Also, for small scale halogenating operations, typical kitchen-type food blenders, which essentially emulate the action of a Henschel mixer, comprise effective mixing means.

The heat to effect a melting of the thermoplastic polymeric material particles, can be derived from substantially any source, or combination of sources. It can be either internally generated by the friction of colliding particles due to the mixing action, or supplied from an external origin, or both, and can also include appropriate preheating of the ingredients through any of such means to accelerate the rate of completing the method. The preferred manner of practicing the method of this invention comprises the internal generation of at least part of the heat energy required through the rubbing action of the particles of thermoplastic polymer material and the filler due to their intermingling and colliding together while mixing. Effective internal heating through particle attrition alone and adequate to produce the required melting for most thermoplastic polymeric materials, and separations of combined polymer and filler, can be attained with either a stirred kettle or Henschel type of mixer.

However, to increase the rate of carrying out the method, it is preferred to augment the internally generated heat with supplemental heating means, such as heaters or heat sources provided within or about the mixing container to more efficiently and controllably bring the temperature of the thermoplastic material up to its melting range. The use of such multiple sources of heat to accelerate the process rate is particularly significant when compounding some of the higher temperature melting thermoplastic polymeric materials. Moreover, the particulate polymer material, and even other ingredients can be preheated to minimize the heating requirements during the process.

In addition to affording the advantages of a practical source of very effective amounts of internally generated heat to support the melting of the thermoplastic polymeric material, high energy and high velocity impeller type mixers, such as the Henschel mixer identified above, are most effective in other aspects of the method, and particularly in providing the magnitude of particle attrition and turbulence which rapidly effects the progressive removal of the molten surface portions from the thermoplastic polymeric particles.

The effect of the mixing and melting operations described, and the physical phenomenon attributable thereto which continuously and progressively renders thin increments of the mass of polyolefin material accessible to the gaseous halogen atmosphere, and thereby facilitates the distribution of the halogenation throughout the polymer mass, is described stepwise and in detail as follows:

Initially the particles of thermoplastic polyolefin material and particulate filler simply intermingle and/or collide as a result of the agitating action of mixing until the temperature of the surface of the thermoplastic polyolefin particles, due to whatever means such as interparticle frictional and/or external heat sources, is raised to the melting level of the particular thermoplastic polyolefin composition. At this stage a halogen should be available in vaporous form to commence the reaction with the initial molten surface of the polyolefin particles.

Thereafter, the filler particles colliding with the softened and viscid or tacky face of the melting surface of the thermoplastic particles, generally adhere and/or embed therein and thus become combined with the surface of the molten layer of the polymer particles. The continuing attrition of the intermingling and/or colliding of the ingredients due to mixing causes a continuous removal or breaking away of thin flake-like surface sections composed of the physically firmer combination of filler and molten polymer from the immediately underlying softened and fluidized melting polymer material of the thermoplastic particles. This resulting separation of thin bodies or flake-like sections of combined filler and polymeric material comprising a former exterior surface, exposes an underlying melting or molten virgin face of the polymeric material of the particles to the action of the halogen. This newly exposed surface portion of polymeric material in turn is then subjected to the halogen and to the colliding action with the filler, and upon combining with the filler and reacting with the halogen is subsequently removed whereby the progressive exposure of the polymeric material in a sequence of film-like increments of substantial surface area to reaction with the halogen is continuously repeated.

Thus by continuing the mixing of the thermoplastic polyolefin particles with the particulate filler in the presence of an atmosphere comprising gaseous halogen, substantially the entire mass of polyolefin particles can be effectively subjected to the action of the halogen in progressive increments of small mass and large surface area, thereby provide for high degrees of uniformity of halogenation throughout the polyolefin material and a homogeneously halogenated product.

The rate of effecting the halogenation reaction with the hot or molten polymeric material and/or the degrees of halogenating of a given amount of polymer material, can be controlled by proportioning the halogen vapor supplied to the mixing ingredients, or diluting the halogen supplied with an inert gas such as nitrogen, helium, carbon dioxide, hydrogen halides, and the like.

For instance, fluorine which can react with explosive-like effects, can be tempered by combining it with an inert gas to provide more moderate reaction conditions.

When required or desired that the halogenated polymer product be free of any filler material attributable to the halogenation process, unwanted processing filler can be removed subsequent to completion of the halogenation process by means of utilizing a filler material of a composition which is soluble in a selective solvent that does not dissolve or act upon the halogenated polymer product, such for example, as water, or acid or alkaline solutions. Removable particulate materials suitable as processing filler for the practice of this invention comprises water soluble crystalline salts, or acid or alkaline soluble mineral fillers such as sodium chloride, magnesium chloride, sodium sulfate, and the like.

However, when a filled compound is suitable or desired as is frequently the case, the method of this invention simultaneously accomplishes both the compounding of ingredients of the composition and the halogenation of the polymer component thereof in a single operation.

Curing agents and other additives which remain solid at the melting and processing temperature level of the particular polyolefin composition may provide a portion of all of the filler for processing. Curing agents or additives which are not stable at the halogenating temperatures of the process, can be blended with the polymer following its halogenation.

In any case, the halogenated products of this invention can thereafter be further mixed or compounded with any ingredients or agents such as liquid components, halogen stabilizing agents comprising metal oxides and the like, or halogen supplementating flame retardants such as antimony oxide.

The following comprise examples of the method of halogenating of this invention. In certain of these examples the halogenation was carried out on a laboratory scale to minimize the processing time and quantities of material expended, the hazards due to the halogen, and also to permit a close and more detailed observation and study of the physical occurrences or changes due to the halogenating while mixing the polymeric material with filler. In each laboratory scale test, the ingredients were mixed together in a kitchen type food blender comprising a Waring blender, Model 5011, with a variable impeller blade speed ranging from about 875 to 1750 R.P.M. The familiar, common kitchen type food blender comprising a transparent jar mixing container, typically of about one liter or more capacity, and provided with a multi-blade high speed impeller in the bottom of the mixing container, constitutes a small scale mixer duplicating the performance and essential construction of a commercial Henschel type mixing apparatus of relatively much larger capacity. In examples 1 and 2 no external heat was applied, and all temperature increases were due solely to the attrition of the polymer particle with the filler and the usual exotherm of the halogenation reaction.

EXAMPLE I

One hundred grams of polyethylene pellets (R4 low density polyethylene, Sinclair-Kippers Co.) of about 3–4 millimeters in diameter, and 50 grams of calcined clay (Whitetex Clay) were placed in a Waring blender and mixed at high speed until the temperature of the mixing batch increased to about 116°C. Chlorine gas was then introduced into the mixing jar through an opening in the jar cap at a rate sufficient to maintain a yellow-green cast in the space above the rapidly mixing pellets of polyethylene and particles of clay. The batch rheology became noticeably less mobile following the addition of the chlorine indicating a conversion to more elastic characteristics. The supply of chlorine gas was maintained and the temperature of the mixing batch continued to increase. When the batch temperature reached 121°C, the mixing speed was reduced with a Variac Speed control in an effort to maintain that temperature. However the batch temperature continued to rise to about 132°C whereupon the mixing speed was again reduced to a relatively slow stirring, but the temperature increase continued.

Meanwhile the surface portions of the polyethylene pellets were softening and melting due to the heat generated by the mixing and the chlorination exotherm, and the clay filler was adhering and combining with the softened and viscid molten surfaces of the pellets, whereupon the combined filler and molten polymer separated or flaked off the surface of the pellets exposing the underlying area. This process of melting and separation, and exposure of a new face, was repeated continuously in the presence of the gaseous chlorine during the mixing with the progressive diminution of the polyethylene pellets and consumption of the clay filler.

When most of the pellets and filler had been consumed by the process, the batch appeared more voluminous and the rate of introducing chlorine gas had to be increased to maintain the yellow-green vapor cast within the mixing jar. When the temperature of the mixing ingredients reached about 136°C, the addition of chlorine gas was terminated and the temperature of the batch continued to rise to about 146°C while the batch became progressively less mobile until it congealed into a stagnant mass. At this stage the mixing was stopped, and the batch was cooled with intermittent brief periods of mixing to break up the batch into a flowable particulate mass. Any free chlorine gas or hydrogen chloride by-product remaining in the jar was purged with air.

Following cooling, the product comprised light brown, free-flowing particles of fine platelets. This material was hot pressed at 300°F into slab specimens.

EXAMPLE II

A batch consisting of 100 grams of polyethylene pellets (R4), 20 grams of wood flour (200 mesh Douglas Fir), 5 grams of carbon black (Thermax MT, R. T. Vanderbilt), 1.75 grams of polytrimethydihydroquinoline antioxidant (Flectal-H, Monsanto), was placed in a Waring blender, the mixing commensed and 3 grams of ASTM No. 2 oil was added dropwise to the mixing ingredients. When the temperature of the mixing ingredients reached about 100°C, chlorine gas was introduced and an atmosphere comprising vaporous chlorine was thereafter maintained within the mixing jar, and the temperature increased to about 115°C. It was evident that the chlorine was also attacking the wood flour and the oil, and possibly the carbon black.

The phenomenon of melting, combining and separation described in Example 1 and elsewhere in the specification, was observed to be repeatedly occurring during the mixing process.

Following substantial disappearance of the pellets and filler materials with the formation of a blend of the ingredients, the batch congealed and the mixing was stopped but the introduction of chlorine gas was continued. At this stage the batch temperature first dripped from about 108° to 101°C in the absence of mixing, but then the temperature reversed itself and began to slowly rise to about 106°C demonstrating the exotherm of the chlorination reaction. At this stage the flow of chlorine gas to the mixer was stopped, and the batch cooled.

This chlorinated polyethylene product exhibited a slightly rubbery character, and was then intermittently mixed and cooled to break up the mass into free flowing particles. Residual free chlorine gas and HCl was purged with air. The material was easily milled on a two roll rubber mill at about 170°F, whereas a temperature of at least about 190°F is needed to mill a comperably filled polyethylene.

EXAMPLES III - X

The following comprises a series of examples demonstrating the properties of polyethylene which has been chlorinated by the method of this invention to several different chlorine contents. The ingredients of each example consisted of 100 grams of polyethylene pellets (R4, about 3 × 4 mm in size) and calcined clay in the amounts specified in the individual examples. The amounts of each ingredient are given in grams weight. All examples were prepared and evaluated as follows:

The ingredients comprising the 100 grams of polyethylene pellets and an initial amount of clay (50 grams or 78 grams as indicated in the table) were placed in a Waring blender and mixed at high speed until the temperature reached 100°C, while the mixing jar was being purged of air by the injection of nitrogen gas. Upon reaching a batch temperature of about 100°C, the nitrogen gas was stopped and chlorine gas was added to the mixing jar at a rate of about 2 grams per minute for the periods given in each individual example. During this stage a peroxide catalyst was progressively added to the mixing batch in increments which totaled in the amounts given in the table. The mixing batch temperature was maintained between 80° and 130°C by means of a combination of controls comprising regulating the mixing speed, the rate of introducing chlorine, the addition of catalyst and of cold reserve filler, and external heating or cooling of the blender jar.

As the mixing progressed, the described physical phenomenon of surface melting of the polymer, combining of filler and molten polymer, and separation of the combined materials occurred, with the gradual diminishment of the pellets and consumption of the filler. Simultaneous therewith, the chlorination of the polyethylene was evidenced by the pronounced evaluation of both heat and hydrogen chloride.

When the original polyethylene pellets and loose clay filler had substantially disappeared, the resulting bodies of the combined chlorinated polyethylene and filler were prevented from congealing and stagnating by the periodic addition of small quantities of loose reserve filler which had been predried and purged with nitrogen.

When the stated chlorination time for each example was completed, the feeding of chlorine gas was stopped and nitrogen gas was introduced into the jar with the mixing ingredients to cool the contents as well as to purge the unreacted chlorine and the hydrogen chloride by-product.

Each chlorinated batch was weighted to determine the weight increase attributable to the chlorination substitution, and the weight increase gave good agreement with the determinations of the extent of chlorination of the polyethylene by chemical methods.

The particulate product of each sample was then milled on a two roll mill and the mill-processing temperature determined. As the percentage of chlorine reacted with the polyethylene increased in the samples, the millprocessing temperatures markedly dropped from a temperature of about 100°C required for a comperably filled polyethylene containing no chlorine. The approximate mill-processing temperature for each example is given in the following table:

After determining the mill-processing temperatures, the milling characteristics of each example specimen was evaluated by milling and compounding with ordinary compounding ingredients including a peroxide curing agent. The samples were pressed and cured for 60 minutes at 300°F into test slabs and evaluated for their physical properties, including stress-strain curves. The stress-strain curves confirmed the mill-processing temperature findings, that progressive reaction of the polyethylene with chlorine by the method of this information converts stiff polyethylene into flexible and rubbery polymers. Flame resistance by the oxygen index test (ASTM D-2863-70), toluene extraction for degree of cure (ASTM D-297), and some electrical properties were also determined. The source of the ultra-violet catalyst in Example X was a General Electric Sunlamp (275 watts, 115 volts); shining downward from about 4 inches above the surface of the stirring batch.

The chlorinated product of each example was in the form of free flowing particles sized from very fine to about 2 mm in diameter, and all samples were very light in color with no discoloration.

The compositions, conditions and extent of chlorination, and assorted properties of the samples are all set forth hereinafter. The ingredients and compositions are all expressed in parts by weight.

EXAMPLES

| Compositions | Standard | III | IV | V | VI * | VII | VIII | IX | X |
| --- | --- | --- | --- | --- | --- | --- | --- | --- | --- |
| | (Control) | | | | | | | | |
| Polyethylene | 100 | 100 | 100 | 100 | 100 | 100 | 100 | 100 | 100 |
| Clay filler | | | | | | | | | |
|   Initial | 50 | 50 | 78 | 78 | 78 | 78 | 78 | 50 | 78 |
|   Reserve | — | 3 | 14 | 14 | 14 | 26 | 12 | 33 | 7 |
| Benzozl Peroxide Catalyst | — | 0.3 | 0.6 | 0.6 | 0.6 | 0.9 | — | 1.7 | — |
| Di-tert. Butyl Perox. Cat. | — | — | — | — | — | — | 2.0 | — | — |
| Ultra-violet light Cat. | — | — | — | — | — | — | — | — | X |
| Chlorination Time, min. | — | 11 | 34 | 34 | 34 | 52 | 100 | 100 | 100 |
| Chlorination Temp., °C | — | 80–128 | 80–122 | 80–122 | 80–122 | 80–127 | 80–120 | 80–115 | 110–124 |
| Chlorine Gas Used, Grams | — | 31 | 54 | 54 | 54 | 118 | 158 | 217 | 153 |

EXAMPLES-Continued

| Compositions | Standard | III | IV | V | VI * | VII | VIII | IX | X |
|---|---|---|---|---|---|---|---|---|---|
| Wt. Atomic Chlorine Picked Up | — | 8 | 11 | 11 | 11 | 19 | 48 | 35 | 42 |
| Wt. % Chlorine in Polymer Obtained | — | 7% | 10% | 10% | 10% | 16% | 32% | 26% | 30% |
| Percent Conversion Cl$_2$ Gas | — | 55 | 37 | 37 | 37 | 29 | 55 | 29 | 55 |
| Mill-Processing Temp. °C | — | — | 75 | 75 | 75 | 35 | 25 | 25 | 25 |
| Compounded With | | | | | | | | | |
| Dythal XL (lead phthalate) | 6 | 2 | 2 | 2 | 2 | 2 | 2 | 20 | 13 |
| Litharge (lead monoxide) | 6 | 3 | 3 | 3 | 3 | 3 | 9 | — | — |
| DiCup R (Dicumyl peroxide) | 6 | 5 | 5 | — | — | 5 | 5 | 5 | 5 |
| Benzoyl peroxide | — | — | — | 4.2 | 4.2 | — | — | — | — |
| Properties | | | | | | | | | |
| Slab Flexibility | Very Slight | Slight | Moderate | Moderate | Moderate | Fairly Rubbery | Very Rubbery | Very Rubbery | Very Rubbery |
| Oxygen Index | 0.190 | 0.213 | 0.227 | 0.221 | 0.223 | 0.235 | 0.296 | 0.274 | 0.292 |
| Tensile Strength psi | 2100 | 1728 | 1135 | 1160 | 1110 | 1135 | 1165 | 1310 | 1030 |
| Elongation, % | 380 | 365 | 315 | 250 | 280 | 295 | 125 | 250 | 125 |
| % Toluene Extractables | 10 | 7 | 13 | 12 | 12 | 10 | 8 | — | 9 |
| Electricals | | | | | | | | | |
| PF | .40 | .26 | .43 | | | | | | |
| SIC | 2.40 | 2.555 | 3.11 | | | | | | |

FOOTNOTE: * In VI — the chlorinated particles were sieved, and only the fraction passing 20 mesh was compounded with stabilizers and curing agent.

The following examples 11 and 12 were carried out in a Waring Blender with low density polyethylene pellets and 325 mesh ground silica filler. The ingredients in relative parts by weight, and conditions were as follows:

| Compositions EXAMPLES | 11 | 12 |
|---|---|---|
| Low-density polyethylene pellets, 3–5 mm diam. (WPD385 Sinclair Koppers) | 110 | 100 |
| Silica, 325 mesh (Wedron) | 50 | 50 |
| Chlorine pickup, weight atomic | 24 | 39 |
| Benzoyl peroxide catalyst | 0.5 | 0.5 |
| Chlorination time, min. | 78 | 81 |
| Chlorination temp, °C | 120–146 | 120–138 |
| Chlorination gas feed, grams | 218 | 256 |
| Percent Conversion of Chlorine | 22% | 31% |
| Weight percent chlorine in chlorinated polymers* | 19% | 28% |
| Ingredients subsequently added to chlorinated polymer on mill | | |
| Lead phthalate stabilizer (Dythal XL) | 2 | 2 |
| Fumed Litharge | 3 | 3 |
| Di-cumyl peroxide | 6 | 6 |
| End composition formed into press cured slab at 300°F for 60 min. | | |
| Oxygen index of slab specimens | 0.252 | 0.304 |

*From materials balance, also confirmed by both wet (K$_2$CO$_3$ fusion, Ag NO$_3$ titration) and dry (TGA) analytical methods.

EXAMPLE 13

A high density polyethylene (Monsanto 17555 HDPE pellets, 3–4 min diam.) was subjected to the same chlorination treatment as the procedure of Examples 11 and 12. However, a higher batch chlorination temperature of 127°–140°C was used to accomodate the higher melting point of the high density polyethylene. Other particulars were as follows: Chlorination time — 70 min. and chlorination feed rate 2.5 grams per min. The free-flowing particulate product contained chlorinated polyethylene polymer with a chlorine content of 17 percent by weight as determined by materials balance.

The chlorination process with the high density polyethylene polymer exhibited the same physical manifestations as observed and heretofore described in the same treatment of low density polyethylene.

EXAMPLE 14

This chlorination process was carried out in a conventional twopiece laboratory glass resin pot. The bottom section of the pot was of 1200 ml volume, and the top or lid section was provided with several ports to accomodate entry of a motor driven propeller-type stirrer, a thermometer, an inlet tube for the introduction of chlorine gas extending down into the pot with its outlet below the batch contents level, and a vent for the gaseous HCL by-product.

The batch ingredients introduced into the pot mixer consisted of 100 grams of low density polyethylene pellets (R4) and 74 grams of calcined clay. The ingredients were agitated at 100 RPM while heating to 105°C with the aid of a Glascol heating mantle around the pot. Nitrogen was passed into the mixing batch while heating up to about 105°C to purge the system. On reaching a temperature of approximately 105°C, the introduction of nitrogen was stopped and chlorine gas was thereafter passed through the inlet tube and into the mixing contents of the resin pot at a rate of 2.2 grams per minute for a reaction period of 29 minutes. Meanwhile 21 grams of benzoyl peroxide catalyst was added periodically in small increments while holding the temperature of the mixing ingredients to a temperature of about 104°–116°C with an external water bath. The agitator was run at a speed of 140 RPM throughout the chlorination reaction. During the chlorination the batch exhibited the usual physical manifestations of the chlorination of the former examples performed in a Waring blender at higher agitation speeds.

After 29 minutes the addition of chlorine was stopped and the reaction batch was purged with nitrogen for 10 minutes. The product tested a 6.5 percent chlorine content by weight of the polyethylene by the materials balance method. The free-flowing white particles of the product were placed on a two-roll mill and were milled at a temperature of 85°C demonstrating that the flux point of the original polyethylene had been substantially depressed. After compounding the chlorinated product with a lead stabilizer and peroxide curing agent and curing in a press, a slab was produced which was decidedly more flexible and elastic than a control sample similarly prepared without chlorination.

EXAMPLE 15

The procedure of Example 14 was repeated in the resin pot with the following ingredients: low density polyethylene pellets (R4) — 110 grams; calcined clay — 10 grams; and, fumed silica (Cabot, Cab-O-Sil MS-7) — 28 grams; The batch was mixed and chlorinated for 70 minutes with a chlorine feed rate of 1.3 grams $Cl_2$ per min. while held at a temperature of about 105-128°C. The product was a mass of free flowing particles containing chlorinated polyethylene with a chlorine content of 18 percent by weight of the polymer.

EXAMPLE 16

One hundred grams of low density polyethylene (R4 pellets 4-5 mm diameter) and 50 grams of calcined clay (Whitex) pretreated with about 1 percent by weight of the clay were mixed at high speed in a Model 5011 Waring kitchen blender. Chlorine gas was promptly introduced into the blender jar before the mixing reached the stage of diminishing the mass of the polymer particles and continued thereafter until the compounding action of the mixing was complete.

Upon examining this product it was calculated from materials balance and compound flux point depression that a chlorinated polyethylene polymer was formed of about 7 weight percent chlorine content. However, from the differences in rheology between the product of this example and that of example 3, it appeared that in addition to the polyethylene being chlorinated, that the silicone material and/or polymerizates thereof had also undergone a reaction with the chlorine.

EXAMPLE 17

A Model 5011 Waring kitchen blender was used to mix 90 grams of low density powdered polyethylene (U.S. Industrial Chemical's Microthene, FN-500) sized about 0.04 mm diameter (about 300 mesh) with 70 grams of calcined clay (Whitex) filler. This batch was heated by stirring to about 80°C while purging the contents of the blender container with nitrogen gas fed through a tube passing down through the top and into the mixing ingredients. On reaching 80°C the nitrogen purge was stopped and chlorine gas was introduced through the tube into the mixing ingredients at a rate of 2 grams per minute for a period of 32 minutes. The batch temperature of the chlorination was maintained between about 101° and 130°C by regulating the blender impeller speed and by the addition of increments of powdered benzoyl peroxide catalyst which totaled 0.75 grams.

After the chlorination had proceeded about 10 minutes, the batch abruptly changed from a freely flowing particulate batch to a coagulated mass with the mixing impeller laboriously carving a cavity into the mass. The addition of about 3 grams of reserve clay filler into the impeller formed cavity of the mass rapidly converted the stagnant mass back to a free flowing particulate state. The batch was thereafter maintained particulate and free flowing throughout the chlorination by subsequent incremental additions of reserve clay filler totaling 81 grams. Chlorination was stopped and the blender and contents was purged with nitrogen for 10 minutes with the contents at about 93° to 105°C.

The batch product was free flowing particles ranging in size from extremely fine up to about 7 mm in diameter. Many randomly selected sample particles were examined and upon cutting open all were found to be uniform throughout their mass with the clay evenly dispersed throught the polymer matrix. The chlorinated polyethylene product was determined to contain about 10 percent by weight by materials balance and flux point depression means.

EXAMPLE 18

Ninety grams of low density polyethylene pellets (R4 Sinclair Koppers, 3-5 mm diameter) and 70 grams of calcined clay (Whitex) were placed in the mixing jar of a Model 5011 Waring kitchen blender and this batch was heated by mixing to a temperature of 117°C while purging the jar contents with nitrogen gas as in Example 17. At 117°C the purge was stopped and 3 grams of liquid bromine was added to the mixing ingredients. Upon addition of the bromine, the space above the mixing polyethylene and clay was filled with the deep orange cast of bromine vapor and this condition of the presence of bromine vapor was maintained in the jar of mixing ingredients for 50 minutes by the subsequent periodic addition of several increments of bromine totaling 34 grams.

During the period of bromination, the temperature of the mixing batch was maintained between 101° and 110°C by varying the impeller speed and by adding increments of powdered benzoyl peroxide catalyst totaling 1.75 grams. As the mixing progressed the polyethylene pellets diminished in size concomitant with the consumption of the loose clay filler, and the commensurate formation of fine particles of mixed filler and polymer. When the original polyethylene particles had disappeared, the batch was maintained particulate and free flowing by incremental additions of reserve clay filler totaling 24 grams. After the 50 minutes period of bromination, the mixing was continued with a nitrogen purge for 10 minutes at a batch temperature of 87° to 98°C.

The product obtained was free flowing particles of a pale pink and ranging in size from very fine up to about 1.0 mm in diameter. The brominated polyethylene product contained about 6 percent of bromine by weight of the polyethylene as determined by materials balance and confirmed by the depressed flux point and rheology of the composition on subsequent hot melting.

In each example of this invention given above, the same characteristic physical phenomenon was observed comprising the melting of surface portions of the polymer particles, the combining of the filler with the melting surface portions of the particles of polymer and the removal of the combined filler and molten polymer material from the particle substrate.

As should be apparent from the foregoing, the mechanism of the method of this invention provides for the maximum exposure of the mass of the polymer material to reaction with a halogen agent under optimum reaction conditions by subjecting a progression of thin film-like increments of hot, molten polymer material to the action of a halogen. The rate and other conditions of the substitution chemical reaction between a halogen and the polyolefin composition can be accelerated or controlled in the practice of this invention by known means such as the application of light or free radical forming catalysts, increased pressure conditions, and the like techniques. Also the reaction rate can be increased or decreased in relation to the degree of reactivity of a given halogen which of course progressively decreased from the highly reactive fluorine, to chlorine and through the lesser reactive vaporized bromine and iodine.

The invention enables the halogenation of polymeric materials to substantially any degree, for example up to about 65 percent by weight of halogen content, and halogen contents of about 30 to 50 percent by weight of the polymer are rapidly achieved. It is also within the scope of this invention to add appropriate amounts of sulfur dioxide to the chlorine or other halogen for application to polyethylene and similar polyolefin for the formation of chlorosulfonated polyethylene or similar sulfonated polyolefin rubbers. For example a ratio of approximately 4.5 parts of by weight sulfur dioxide per 100 parts by weight of chlorine will produce a typical chlorosulfonated polyethylene.

In addition to polyethylene, polyolefinic materials to be halogenated by the novel method of this invention include polymers comprising ethylene such ethylene-vinyl acetate and copolymers of ethylene and propylene, polyvinylidene, polypropylene, homo-or copolymers of alpha-olefins having higher molecular weight than propylene, such as butene-1, pentent-1, hexene-1, butadiene, and other hydrocarbon type polymers.

The polyolefin material preferably should be in particulate form, as opposed to one or more relatively large solid bodies or lumps. Large bodies or lumps of many polymers, however, can be broken or cut up by the action of the mixing impeller into suitable particles for halogenation. Also this invention can be practiced with the polymeric material in molten form whereupon the mass of the molten material is mechanically fragmented by the action of the mixing into small particles which are intermingled with the filler. Beads of pellets of polymeric material sized about 2 to 8 millimeters in diameter (approximately No 10 US Sieve Series up to about 5/16 inch in diameter) are preferred because they are conductive to optimizing the physical mechanism of the process. However, the halogenating method of this invention is effective with polyolefin particles of a wide range of sizes including particles extending from relatively fine powder such as particles sized down to about 100 US Sieve Series, up to substantial chunks of about an inch or more in diameter.

Suitable particulate filler materials for the process, and also for filling the halogenated polymer products, comprise most common fillers or solid compounding ingredients and agents used in typical polymeric compounds. Included are particulate materials of natural or synthetic and mineral or non-mineral origin, and of any configuration, such as spheres, plates or fibers, which are available as fine solids of sufficient thermal resistance to maintain their solid physical structure at least at the melting temperature of the particular polymeric material to be halogenated. Typical fillers include clays, carbon black, wood flour, various forms of silic including common sand, glass, metals and oxides of metals such as aluminum oxide, titanium dioxide, magnesium oxide, calcium carbonate, barium carbonate, magnesium carbonate, barium sulfate, antimony trioxide, calcium silicate, diatomaceous earth, Fuller's earth, mica, talc, slate flour, volcanic ash, glass fiber, asbestos and many others. However, the possible effects of the particular halogen upon given filler material and the product must be taken into consideration.

Moreover it is often advantageous for the filler component to comprise or include a material which exerts a stabilizing effect upon the halogenated polymer material, such as metals, oxides or organic salts of lead, cadmium, barium, zinc and tin.

Apt particle sizes for fillers in general comprise, for example, from about 100 US Sieve Series (approximately 149 micron in diameter) down to about 400 US Sieve Series (approximately 37 micron) or smaller, such as sub-micron sizes. In the case of fibrous or elongated and irregular shaped fillers, the specified sizes should be applied to the particles smallest cross-sectional dimension. Moreover, due to the physical mechanism of the process of the invention, the filler particles should be of a relatively smaller size than the polymer particles whereby the filler particles can be combined by adherence to the viscid molten surface portions of the particles of the polymer material.

The related proportions of the filler type material to the thermoplastic polyolefin for the halogenation process of this invention are dependent upon several factors, including the initial size of the polyolefin particles, the extent of halogenation desired and the amounts of filler content suitable for the halogenated product, among other possible conditions. Moreover filler material can be added initially or progressively throughout the process such as in several increments, and additional filler material can be introduced at substantially any stage of the process as needed, or progressively throughout the process, and thereafter some or all filler can be removed by appropriate means. Nevertheless the proportions of filler materials, including that initially and subsequently added, may range from about 5 to 400 parts by weight per 100 parts by weight of thermoplastic polyolefin material. It should be appreciated, however, that conditions such as the filler particle size and density, or bulk density, with respect to some fillers may have significant influence upon the relative weight proportions of polyolefin material to fillers and in turn the amounts measured in weight of a given filler material for use in the halogenation process. For clay, one of the most common fillers for polymeric compounds, and other materials of similar bulk densities, a typical amount of filler for the process comprises about 25 to 200 parts by weight of filler per 100 parts by weight of polyolefin material.

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. A method of halogenating polyolefin compositions comprising the steps of: mixing particles of thermoplastic polyolefin material with particulate filler while melting surface portions of the polyolefin particles within an atmosphere comprising vaporous halogen and thereby reacting the halogen with the melting polyolefin while combining the filler with said melting surface portions of the polyolefin particles, removing the resultant combined filler and molten halogenated polyolefin from the particles by the mixing action and thereby exposing underlying portions of the polyolefin particles to said mixing of the particles with the particulate filler, said melting and reacting of the melting polyolefin with the halogen, and said combining of the filler with the melting polyolefin whereby the particles of polyolefin material are subjected to a progressive halogenation.

2. The method of halogenating polyolefin compositions of claim 1, wherein the mixing of the particles of thermoplastic polyolefin material with the filler and the melting of the surface portions of the polyolefin particles within an atmosphere comprising vaporous halogen with the resultant reacting of the halogen with the melting polyolefin, combining of the filler with said melting surface portions of the polyolefin particles and removing of the combined filler and molten halogenated polyolefin from the particles thereby exposing underlying portions of the polyolefin particles to said conditions to effect a progressive halogenation of the polyolefin material, is continued and the halogenation of the polyolefin material progresses substantially through the particles thereof until said polyolefin particles become substantially diminished and the polyolefin material is substantially uniformly halogenated throughout.

3. The method of halogenating polyolefin compositions of claim 2, wherein the vaporous halogen is supplied substantially throughout the mixing of the polyolefin particles with filler and the melting of surface portions of the polyolefin particles.

4. The method of halogenating polyolefin compositions of claim 3, wherein the particulate filler is substantially removed from the halogenated polyolefin composition.

5. A method of halogenating thermoplastic polyolefin compositions, comprising the steps of: mixing with high energy and high velocity particles of thermoplastic polyolefin material and particulate filler in an amount of at least about 5 parts by weight per 100 parts of polyolefin material, and heating the surface portions of the particles of polyolefin material to at least approximately the melting temperature of the polyolefin material within an atmosphere comprising vaporouss halogen and thereby melting said surface portions of the polyolefin particles and reacting the halogen with the melting polyolefin while combining the filler with said melting surface portions of the polyolefin particles, removing the resultant combined filler and molten halogenated polyolefin from the particles by the mixing action and thereby exposing underlying portions of the polyolefin particles to said mixing of the particles with the particulate filler, said melting and reacting of the melting polyolefin with the halogen, and said combining of the filler with the melting polyolefin whereby the particles of polyolefin material are subjected to a progressive halogenation.

6. The method of halogenating thermoplastic polyolefin compositions of claim 5, wherein the polyolefin comprises polyethylene.

7. The method of halogenating thermoplastic polyolefin compositions of claim 6, wherein the vaporous halogen is supplied substantially throughout the mixing of the polyolefin particles with filler and the melting of surface portions of the polyolefin particles.

8. The method of halogenating thermoplastic polyolefin compositions of claim 5, wherein the high energy and high velocity mixing of the particles of thermoplastic polyolefin material with the filler and the melting of the surface portions of the polyolefin particles within an atmosphere comprising vaporous halogen with the resultant reacting of the halogen with the melting polyolefin, combining of the filler with said melting surface portions of the polyolefin particles and removing of the combined filler and molten halogenated polyolefin from the particles thereby exposing underlying portions of the polyolefin particles to said conditions to effect a progressive halogenation of the polyolefin material, is continued and the halogenation of the polyolefin material progresses substantially through the particles thereof until said polyolefin particles become substantially diminished and the polyolefin material is substantially uniformly halogenated throughout.

9. The method of halogenating thermoplastic polyolefin compositions of claim 8, wherein the atmosphere comprising vaporous halogen is maintained substantially throughout the mixing of the polyolefin particles with filler and the melting of surface portions of the polyolefin particles.

10. The method of halogenating thermoplastic polyolefin compositions of claim 9, wherein the halogen comprises chlorine.

11. A method of halogenating polyolefin compositions, comprising the steps of: mixing particles comprising polyethylene with particulate filler in an amount of at least about 5 parts by weight per 100 parts of polyethylene while melting surface portions of the polyethylene within an atmosphere comprising vaporous halogen and thereby reacting the halogen with the melting polyethylene while combining the filler with said melting surface portions of the polyethylene particles, and removing the resultant combined filler and molten halogenated polyethylene from the particles by the mixing action and thereby exposing underlying portions of the polyethylene particles to said mixing of the particles with the particulate filler, said melting and reacting of the melting polyethylene with the halogen, and said combining of the filler with the melting polyethylene whereby the particles of polyethylene are subjected to a progressive halogenation.

12. The method of halogenating polyolefin compositions of claim 11, wherein the mixing of the particles comprising polyethylene with the filler and the melting of the surface portions of the polyethylene particles within an atmosphere comprising vaporous halogen with the resultant reacting of the halogen with the melting polyethylene, combining of the filler with the melting surface portions of the polyethylene particles and removing of the combined filler and melted polyethylene from the particles thereby exposing underlying portions of the polyethylene particles to said conditions to effect a progressive halogenation of the polyethylene, is continued and the halogenation of the polyethylene progresses substantially through the particles thereof until the polyethylene particles become substantially diminished and the polyethylene is substantially uniformly halogenated throughout.

13. A method of halogenating thermoplastic polyolefin compositions, comprising the steps of: mixing particles of a thermoplastic polymer comprising ethylene with particulate filler in an amount of about 5 to 400 parts by weight per 100 parts of polymer, and heating the surface portions of the particles of polymer comprising ethylene to at least approximately the melting temperature of the polymer within an atmosphere comprising vaporous halogen and thereby melting said surface portions of the polymer particles and reacting the halogen with the molten polymer while combining the filler with said melting surface portions of the particles, and removing the resultant combined filler and molten halogenated polymer from the particles by the mixing action and thereby exposing underlying portions of the particles of polymer comprising ethylene to said mixing of the particles with the particulate filler, said melting and reacting of the melting particles of polymer comprising ethylene with the halogen, and said combining of the filler with the melting particles of polymer comprising ethylene whereby the particles of polymer comprising ethylene are subjected to a progressive halogenation.

14. The method of halogenating thermoplastic polyolefin compositions of claim 13, wherein the particulate filler comprises clay.

15. The method of halogenating thermoplastic polyolefin compositions of claim 14, wherein the atmosphere comprising vaporous halogen is maintained substantially throughout the mixing of the polymer particles with the clay filler and the melting of surface portions of the polymer particles.

16. The method of halogenating thermoplastic polyolefin compositions of claim 15, wherein the mixing of the particles of polymer comprising ethylene with the clay filler and the melting of the surface portions of the polymer particles within an atmosphere comprising vaporous halogen with the resultant reacting of the halogen with the melting polymer, combining of the clay filler with said melting surface portions of the polymer particles and removing of the combined clay filler and molten halogenated polymer from the particles thereby exposing underlying portions of the particles of polymer comprising ethylene to said conditions to effect a progressive halogenation of the polymer, is continued and the halogenation of the polymer progresses substantially through the particles thereof until said polymer particles become substantially diminished and the polymer material is substantially uniformly halogenated throughout.

17. The method of halogenating thermoplastic polyolefin compositions of claim 16, wherein the halogen is chlorine.

18. The method of halogenating thermoplastic polyolefin compositions of claim 17, wherein the polymer comprising ethylene is polyethylene.

* * * * *